United States Patent
Götz et al.

(10) Patent No.: US 7,999,498 B2
(45) Date of Patent: Aug. 16, 2011

(54) SYSTEM FOR ESTIMATION OF POSITION AND SPEED IN A PERMANENT MAGNET ROTOR OF AN ELECTRICAL MOTOR

(75) Inventors: Fritz Rainer Götz, Oberasbach (DE); Viktor Barinberg, Nürnberg (DE); Franz Jäger, Nürnberg (DE)

(73) Assignee: Baumuller Nurnberg GmbH, Nuremberg (DE)

( * ) Notice: Subject to any disclaimer, the term of this patent is extended or adjusted under 35 U.S.C. 154(b) by 629 days.

(21) Appl. No.: 12/177,182

(22) Filed: Jul. 22, 2008

(65) Prior Publication Data

US 2009/0030645 A1   Jan. 29, 2009

(30) Foreign Application Priority Data

Jul. 26, 2007   (EP) ..................................... 07113231

(51) Int. Cl.
*H02P 21/00* (2006.01)

(52) U.S. Cl. ............................... 318/400.02; 318/400.01

(58) Field of Classification Search ............. 318/400.01, 318/400.02, 609, 610, 621, 558
See application file for complete search history.

(56) References Cited

U.S. PATENT DOCUMENTS

| | | | |
|---|---|---|---|
| 2005/0029972 A1* | 2/2005 | Imai et al. | 318/254 |
| 2005/0160771 A1* | 7/2005 | Hosoito et al. | 68/12.16 |

OTHER PUBLICATIONS

Suleiman M Abu Sharkh and Victor Barinberg, A New Approach to Rotor Position Estimation for a PM Brushless Motor Drive, pp. 1199-1203, 0-7803-3879-0/98, Department of Electrical Engineering, University of Southampton, Highfield, Southhampton, United Kingdom.
M. Schrödl, E. Robeischl, Sensorlose Drehzahl—und Lageregelung, Elektrotechnik und Informationstechnik, 2000, pp. 103-112.

* cited by examiner

*Primary Examiner* — Bentsu Ro
*Assistant Examiner* — Jorge L Carrasquillo
(74) *Attorney, Agent, or Firm* — Frank H. Foster; Kremblas & Foster

(57) ABSTRACT

Procedure for estimating the electrical drive speed and position of a permanent magnet rotor of a brushless electrical linear or rotating motor, especially for a drive control circuit, using multi-phase current measurements on the motor, whose measurement values, depending on the estimated position, are transformed into a rotor-related d,q reference frame i.e. into a direct current vector component and a quadrature current vector component, and the direct and quadrature vector components of current and a voltage, together with the estimated speed, are fed as input variables to a mathematical motor model, and the motor model generates a first output variable and a second output variable, whereby the first output variable in the d,q reference frame corresponds to the d or direct vector component as well as to a position estimation error, and the second output variable in the d,q reference frame corresponds to the q or quadrature component as well as to a speed estimation error, and the two output variables are fed to a tracking controller for estimating and outputting the position and/or speed, whereby from the motor model a third output variable is computed, by
 a) the direct and quadrature vector components of current each being weighted with a direct and quadrature inductance of the motor,
 b) the third output variable being formed from the difference between the two weighting results,
whereby the third output variable is fed to the tracking controller for processing to estimate the position and speed.

18 Claims, 2 Drawing Sheets

SYSTEM FOR ESTIMATION OF POSITION AND SPEED IN A PERMANENT MAGNET ROTOR OF AN ELECTRICAL MOTOR

BACKGROUND OF THE INVENTION

The invention relates to a procedure for estimating drive speed and position of a permanent magnet rotor of a brushless electrical motor. This procedure is especially suited for use in a drive control circuit. For the procedure, multiple-phase current measurements are used on the motor, whose measurement values, depending on the position estimated, are transformed into a rotor-related d,q-reference frame, i.e. to a direct current vector component and a quadrature current vector component. Together with the estimated (electrical) r.p.m., the direct and quadrature vector components of a current and of a voltage demand are applied as input variables to a mathematical model of the electrical motor. The motor model generates a first output variable and a second output variable, whereby the first output variable corresponds in the d,q reference frame to the d- or direct vector component as well as to a position estimation error, and the second output variable in the d,q reference frame corresponds to the q or quadrature component as well as to a speed estimation error. The two output variables are applied to a tracking controller for estimating and outputting the speed, or the electrical r.p.m., and the position, or the electrical angle. The invention further relates to a position- and/or speed-estimation device to carry out this procedure, a motor modeling module, and a speed tracker according to the respective first parts or preambles of the collateral, independent claims 8, 12 and 15.

For estimation of the position and speed of the permanent magnet rotor in a brushless electrical drive motor, in the Austrian specialized journal "Elektrotechnik und Informationstechnik," no. 2 for 2000, the article "Controlled Drives", on pages 103-112, by M. Schrödl and E. Robeischl, provides information about an EMF- or voltage model of the permanent magnet synchronous motor, capable to estimate in real time position and speed information, necessary for example for a drive control, from electrical quantities at higher speed (in the area above about 10% to 20% of nominal speed). The rotor position estimation based on the voltage induced in the stator winding, which does not influence current control. The basic idea of that is to use measurement technique to evaluate the change in the stator flux linkage space vector. By measurement of the current signals, the change in the permanent magnet flux linkage of the permanent magnet rotor is detected.

A system for estimating the drive position and/or speed in a brushless electrical motor, especially a synchronous motor, with a permanent magnet rotor, of about the same type named in the first paragraph, is known, cp. S. M. Abu-Sharkh's and V. Barinberg's article "A new approach to rotor position estimation for a PM brushless motor drive", Mediterranean Electrotechnical Conference, 1998, pages 1199-1203. According to it, the rotor position and/or speed likewise identified using the EMF—voltage model of the electrical motor. The differentiation of current signals that are necessary for that, but problematical in practice, are avoided by usage of parameter-sensitive low-pass filters, whose time delaying influence is compensated by a proportional-plus-integral tracking controller (PI tracking filter) that is inserted after. The time constant of the low pass filters corresponds the stator time constant of the electrical motor. Using the low pass filters, position and speed estimation errors are weighted.

SUMMARY OF THE INVENTION

The task that is the basis for the invention is to structurally simplify the system for estimating drive position and speed.

For solving this, we refer to the estimation procedure indicated in claim 1, the estimation device indicated in claim 8, the motor modeling module indicated in claim 12, and the tracking controller indicated in claim 15. Optional advantageous further embodiments of the invention can be gleaned from the dependent claims.

It is true that according to the invention the motor model operates in such a way that it outputs the third deviation variable to the tracking controller; however, the third output variable is generated by computing steps that are easy to implement, which merely include weightings through proportional gains equal to fixed inductance values, as well as addition and subtractions, and thus are to be realized with computationally simple and fast functional components like P-element and summating element. Thus with this invention, the advantage of an increase in efficiency is attained, especially since neither a differentiation of currents nor additional phase lagging filters such as the low-pass filter used as above with the state of the art are necessary.

It is appropriate that as part of the motor model, the two weighting results (the current direct component weighted with direct inductance and the current quadrature component weighted with quadrature inductance) be modified according to a motor-specific EMF constant or a time constant. Then, with a particular advantage, in the tracking controller an integration can be carried out, with the constants above as integration parameters, of a difference between the errors in estimating position and speed ("position deviation" and "speed deviation," respectively), or the respective direct and quadrature components of the voltage deviation.

In a further embodiment of the invention, the third output variable fed to the tracking controller is added or linked in some other way to an integration result of a difference between the position estimation error and the speed estimation error. If necessary the position estimation error can be proportionally amplified beforehand. The result can then be outputted from the tracking controller as an estimated speed. An advantage obtained is that the structure of the tracking controller is simplified, with a pure integration element, a more complex proportional-plus-integral element being avoided.

According to one embodiment version of the invention, with forwarding the third output variable to the tracking controller, both the proportional element there (can be interpreted as a "position controller") and the first pure integration element without a proportional part (can be interpreted as a "speed controller") are skipped over a summation place inserted after these. Therefore, it is appropriate to bring the (skipped) proportional amplification to effect already in the motor model in forming the third output variable. This can be implemented in that after insertion into the motor model the current-direct vector component is weighted in it with this proportional amplification or gain.

BRIEF DESCRIPTION OF THE SEVERAL VIEWS OF THE DRAWINGS

Further particulars, features, combinations of features, advantages and effects based on the invention can be gleaned from the following description of preferred embodiment forms of the invention, as well as from the drawings. Depicted schematically as block diagrams, these show.

DETAILED DESCRIPTION OF THE INVENTION

Figure 1:
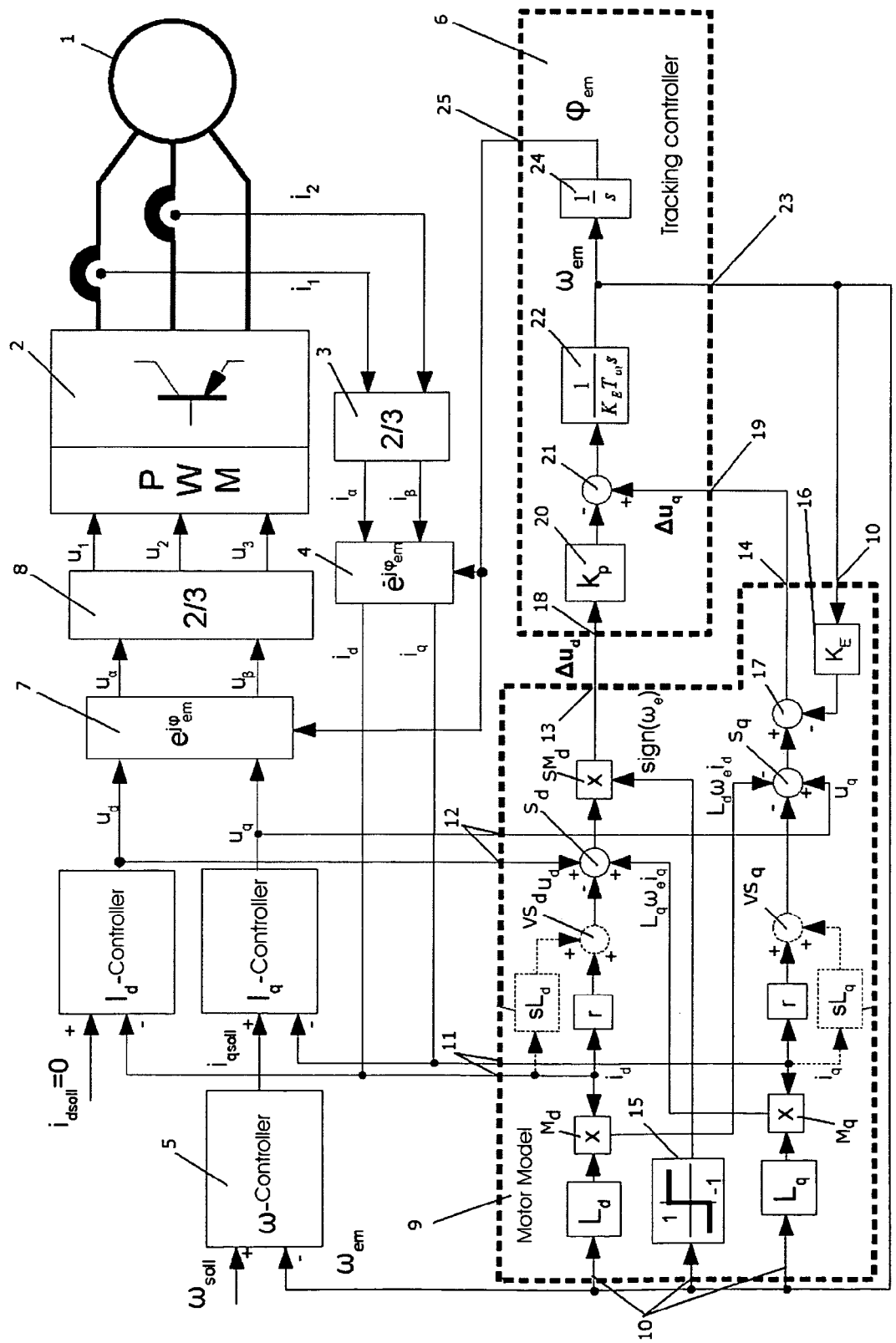
FIG. 1 and as a mental starting point, a drive control circuit with a motor model and an invention-specific tracking controller inserted after, whereby to enhance comprehension of the invention, the motor model still contains the disadvantageous direct differentiation of currents.

According to FIG. 1, Stator 1 of a brushless electrical motor such as a synchronous motor with a permanent magnet rotor, is supplied by a converter 2 operating based on pulse width modulation (PWM) with a three-phase alternating current. For a current control, from the stator, the two phase currents $i_1$, $i_2$ are accessed and measured, which are transformed in a 3-to-2 phase transformation unit 3 to a stator-related, orthogonal α, β-reference frame. In the course of the transformation, two of the vector components $i_\alpha$, $i_\beta$ representing the stator current α, β are generated and outputted to a second coordinate transformation unit 4 that is inserted after. This is embodied to carry out a coordinate transformation from the stator-related α,β-reference frame to a rotor-related d,q-reference frame with the output of the current direct and quadrature vector components $i_d$, $i_q$. The direct and quadrature vector components $i_d$, $i_q$ of the stator current are passed as feedback values to the direct current and quadrature current regulators $I_d$, $I_q$ for a comparison with the corresponding direct and quadrature current command values $i_{dsoll}$, $i_{qsoll}$. As is customary in the specialty, the direct current command value $i_{dsoll}$ is preset at zero, while the quadrature current regulator receives the command value $I_{qsoll}$ from a speed controller 6 placed ahead. This carries out a comparison of a command r.p.m. value $\omega_{soll}$ with the calculated or estimated value issued by a tracking controller 6 for an electrical r.p.m. $\omega_{em}$. Additionally an estimated electrical angle $\Phi_{em}$ is issued by the tracking controller 6 and fed to the second transformation unit 4 as well as to a third transformation unit 7 complementary to it. The third transformation unit 7 further receives from current controllers $I_d$, $I_q$ direct and quadrature voltage demand vector components $u_d$, $u_q$ and transforms them into the stator-related α, β-reference frame with the voltage demand vector components $u_\alpha$, $u_\beta$. The latter voltage vector components are received by a 2-to-3 phase transformation unit 8, which converts the voltage demands into three corresponding phases $u_1$, $u_2$, $U_3$ for the converter 2 placed after.

According to FIG. 1, a motor modeling module 9 is placed ahead of the tracking controller 6. This has input interfaces 10 for the estimated r.p.m. $\omega_{em}$, 11 for the direct and quadrature currents $i_d$, $i_q$ measured and transformed into the d,q-reference frame and 12 for the direct and quadrature voltage demands $u_d$, $u_q$ in the d,q reference frame. Additionally the modeling module 9 has a first output interface 13 for the direct voltage deviation $\Delta u_d$ and a second output interface 14 for the quadrature voltage deviation $\Delta u_q$.

According to FIG. 1, the estimated r.p.m. $\omega_{em}$ fed via the r.p.m. input interfaces 10 to the motor model 9, is weighted with multiple separate proportional elements, whose amplifications correspond to the EMF constant $K_E$, the motor direct inductance $L_d$ and the motor quadrature inductance $L_q$. Additionally, the inputted r.p.m. $\omega_{em}$ is weighted with a sign-element 15. The outputs of the inductance-proportional-elements $L_d$, $L_q$ are each connected to a specially assigned multiplier $M_d$, $M_q$.

The second inputs of the multipliers $M_d$, $M_q$ are each connected to the corresponding two current input interfaces 11 for direct and quadrature current $i_d$, $i_q$ respectively. The outputs of each of multiplier elements $M_d$, $M_q$ are connected respectively to the direct and quadrature voltage summation units $S_q$, $S_d$ with negative and positive signs respectively.

Each of the second inputs of the direct or quadrature voltage summation units $S_d$, $S_q$ is connected via the voltage input interfaces 12 to the direct and quadrature voltage demands $u_d$, $u_q$ with a positive sign. The two voltage summation elements $S_d$, $S_q$ each possess an additional negative input (each with a negative sign) to which a particular output of two voltage summation elements $VS_d$ and $VS_q$ for the summation of resistive and inductive direct and quadrature voltage intermediate values is assigned, which are generated using the direct and quadrature currents fed via the current input interfaces 11. For this generation, on the one hand a proportional element serves with the amplification r corresponding to the resistance. On the other hand, as required by motor physics, the inductive elements and the direct and quadrature inductivity $L_d$, $L_q$, are implemented using the differentiators $sL_d$ and $sL_q$ (s—differential Laplace Operator) for the computation of the voltage intermediate values. The inputs of the proportional element r und differentiators $sL_d$, $sL_q$ are linked thereto with the corresponding current input interfaces 11. The outputs of the proportional element r and the differentiators $sL_d$ and $sL_q$ are therefore connected to the respective inputs of positive sign of the summation elements $VS_d$, $VS_q$.

According to FIG. 1, the "sign" element 15 is linked on the input side with the r.p.m. input interface 10 and on the output side with the first input of a signed multiplier $SM_d$. Its second input is connected to the output of the direct voltage summation element $S_d$, and the output of the signed multiplier $SM_d$ is linked with the first output interface 13 for the direct vector component $\Delta u_d$ of the voltage deviation. By this means, the direction of the rotor speed of the electrical motor can be taken into account in the calculation of the position estimation error.

According to FIG. 1, in calculating the speed estimation error, in the form of the quadrature vector component $\Delta u_q$ of the voltage deviation, the EMF motor constant comes in via a proportional element 16 dimensioned with corresponding amplification gain. For this on the input side the EMF proportional element is linked with the r.p.m. input interface 10. On the output side, the EMF proportional element 16 is connected to the negative input of an EMF summation element 17, whose positive input is connected to the output of the quadrature voltage summation element $S_q$. The output of the EMF summation element 17 is fed directly to the second or quadrature voltage deviation output interface 14 of the modeling module for issuance of the speed estimation error to the tracking controller 6 placed after.

According to FIG. 1, the tracking controller has two input interfaces 18, 19 for the direct and quadrature vector components $\Delta u_d$, $\Delta u_q$ of the voltage deviation computed in modeling module 9. The direct vector component corresponds to the position estimation error, and the quadrature vector component to the speed estimation error. The input interface 18 for the direct voltage deviation $\Delta u_d$ is fed directly to a proportional element 20, which is dimensioned with the proportional amplification kp and is connected on the output side with the negative input of a first tracking summation element 21. Its positive input internally is connected directly in the tracking controller 6 with the input interface for the quadrature voltage deviation $\Delta u_q$. The summation result is brought on the output side to a first integration element 22, which according to the invention is embodied with no proportional part and is dimensioned on the basis of the EMF constant $K_E$ and a time constant $T_\omega$. At its output there arises, via integration of the difference of the direct and quadrature voltage deviation over the time, the estimated drive angular velocity or r.p.m. $\omega_{em}$, which, via a first tracking controller output interface 23 is fed both to the motor modeling module 9 and also to the speed regulator 5 as a feedback value i.e. for comparison with a speed target value $\omega_{soll}$ and for calculation of a quadrature current command value $i_{qsoll}$. Additionally, internally in the tracking controller 6, the estimated drive speed $\omega_{em}$ is processed with a second integration element 24 which from there, in a well-known manner, calculates the drive position or angular position and issues it via the second tracking controller output interface 25. As has already been addressed above, the electrical drive position $\phi_{em}$, issued via the second tracking controller output interface, serves to control the two $\alpha,\beta/d,q$ and $d,q/\alpha,\beta$ transformation units 4, 7. The invention-specific tracking controller is already distinguished through the simplified I (integral) structure with two integration elements 22, 24 that follow each other directly.

Figure 2:
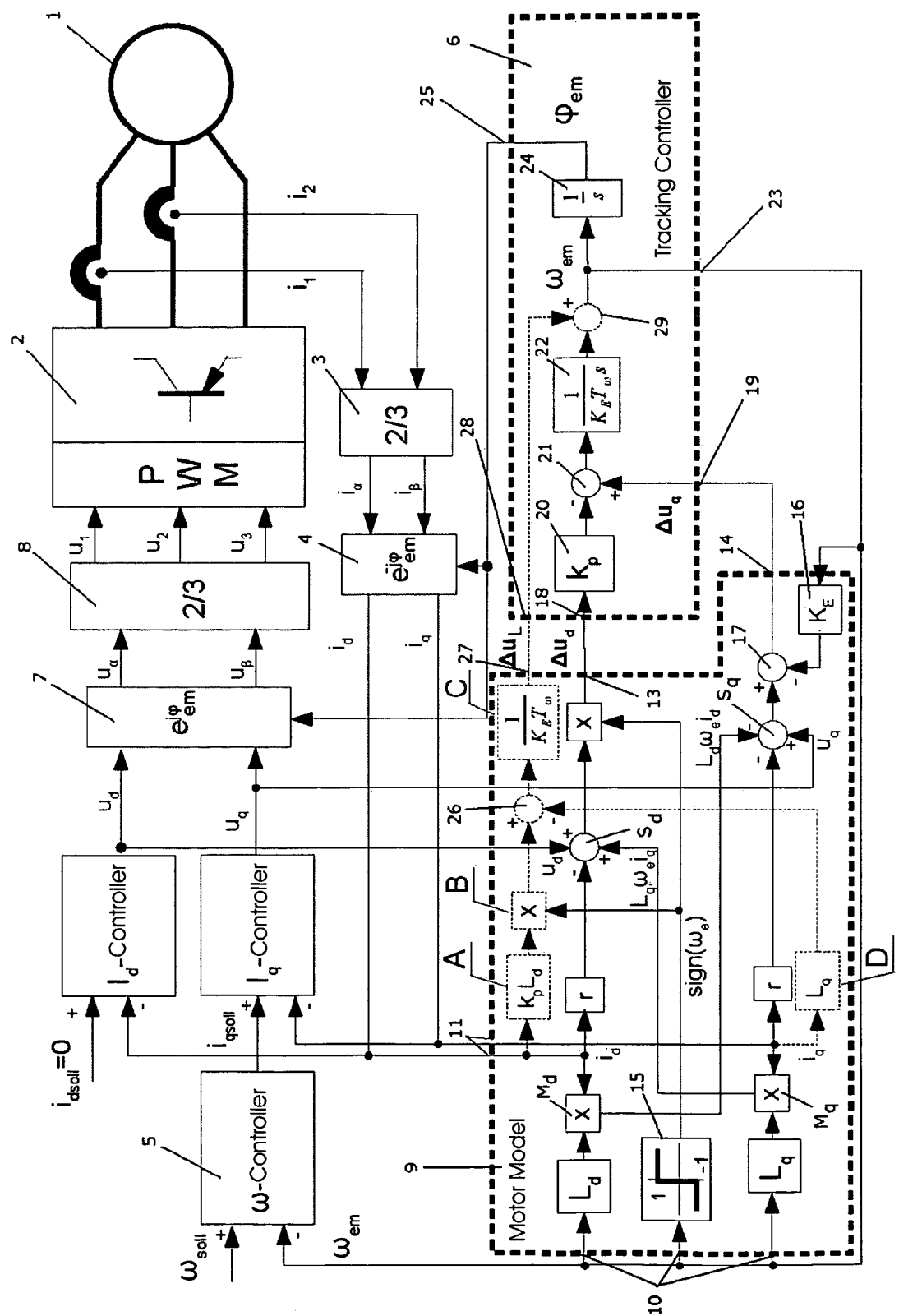
FIG. 2 a drive control circuit with a motor model embodied according to the invention and a tracking controller appropriately adapted.

FIG. 2 depicts a drive control system modified from that of FIG. 1. The main modifications are manifest in the blocks of the modeling module 9 designated by A-D and in a third input interface 28 of tracking controller 6.

According to FIG. 2, as compared to the modeling arrangement of FIG. 1, the inductance differentiator $sL_d$, $sL_q$ there are replaced by inductance proportional elements A, D with the direct and quadrature inductance $L_d$, $L_q$ as amplification gains. An additional proportional element, corresponding to the proportional element 20 named above in connection with tracking controller 6 (able to be interpreted as a "position control element"), can be connected in series ahead of or behind the inductance proportional element A. The output of the inductance proportional element A, responsible for the direct vector component, is connected to a multiplier element B, whose second input is linked with the output of the already mentioned sign-element 15, whereby the direction of the rotation or linear motion of the rotor is taken into account. The output of the multiplier element B is connected to the plus input of an inductance summation element 26, whose second input, provided with a negative sign, is connected with the output of the inductance proportional element D responsible for the quadrature current component. The difference value resulting at the output of the inductance summation element 26 is weighted with the an assigned proportional element C, which on the output side is linked with the third output interface 27 for the inductance voltage deviation $\Delta u_L$ and appropriately dimensioned to the motor-specific EMF constant $K_E$ and the time constant $T_\omega$.

According to FIG. 2, the value issued at the third output interface 27 or at the output of the proportional element C for the inductance voltage deviation $\Delta u_L$ is inputted to the third input interface 28 of tracking controller 6. Internally the voltage deviation $\Delta u_L$ in the tracking controller is applied to a second tracking summation element 29 with a positive sign. To the second input of the second tracking summation element 29, the output of the first integration element 22 is likewise connected with a positive sign. The output of the second tracking summation element 29 is in direct connection with the first tracking output interface 23 for feedback of the estimated drive speed $\omega_{em}$ as well as with the input of the second integration element 24 for estimation and outputting of the drive position $\phi_{em}$ to the second and third coordinate transformation units 4, 7.

What is common to the two embodiment examples according to FIGS. 1 and 2, is that the position and speed are estimated "sensory" solely through measurements of the stator currents $I_1$, $I_2$.

| | Reference symbols |
|---|---|
| 1 | Stator |
| 2 | Power converter |
| 3 | 3-to-2 phase transformation unit |
| 4 | second coordinate transformation unit |
| $i_\alpha$, $i_\beta$ | current components in stator-related $\alpha$, $\beta$-reference frame |
| $i_{dsoll}$, $i_{qsoll}$ | Direct and quadrature current target value |
| $I_d$, $I_q$ | Direct and quadrature current controllers |
| 5 | speed controller |
| 6 | Tracking controller |
| $\omega_{soll}$ | r.p.m. command value |
| $\omega_{em}$ | estimated electrical r.p.m. |
| $\phi_{em}$ | estimated electrical angular position |
| 7 | Third coordinate transformation unit |
| $u_d$, $u_q$ | Preset direct and quadrature voltages |
| $u_\alpha$, $u_\beta$ | stator-related voltage demands in $\alpha$, $\beta$ reference frame |
| 8 | 2-to-3 phase transformation unit |
| $u_1$, $u_2$, $u_3$ | voltage demands for three phases |
| 9 | Motor modeling module |
| 10 | r.p.m. input interfaces |
| 11 | current input interfaces |
| 12 | voltage input interface |
| 13, 14 | 1st & 2nd output interface for internally computed voltage deviation vector components |
| $K_E$ | EMF constant |
| 15 | Sign element |
| $M_d$, $M_q$ | Multiplier elements |
| $S_d$, $S_q$ | Voltage summation elements |
| $VS_d$, $VS_q$ | Summation elements |
| r | Proportional element for motor resistance |
| $sL_d$, $sL_q$ | direct, quadrature current differentiators |
| $SM_d$ | signed multiplier element |
| $\Delta u_d$ | direct vector component |
| $\Delta u_q$ | quadrature vector component |
| 16 | EMF proportional element |
| 17 | EMF summation element |
| 18, 19 | Input interfaces for direct and quadrature voltage deviation |
| 20 | Proportional element |
| 21 | first tracking summation element |
| 22 | first integration element |
| 23 | first tracking controller output interface |
| 24 | second integration element |
| 25 | second tracking controller output interface |
| A, D | Inductance proportional elements |
| B | Multiplier element |
| 26 | Inductance summation element |
| C | Proportional element |
| 27 | third output interface |
| 28 | third input interface |
| 29 | second tracking summation element |

What is claimed is:

1. Procedure for estimating the electrical drive speed ($\omega_{em}$) and position ($\phi_{em}$) of a permanent magnet rotor of a brushless electrical linear or rotating motor, for a drive control circuit, using multi-phase current measurements at the motor, whose measured values ($i_1$,$i_2$) depending on the estimated position ($\phi_{em}$), are transformed into a rotor-related d,q-reference frame, to a direct current vector component ($i_d$) and a quadrature current vector component ($i_q$), and the direct and quadrature vector components of current ($i_d$,$i_q$) and a voltage demand ($u_d$,$u_q$) together with the estimated speed ($\omega_{em}$) are fed as input variables to a mathematical motor model (9), and the motor model (9) generates a first output variable ($\Delta u_d$) and a second output variable ($\Delta u_q$), whereby the first output variable ($\Delta u_d$) corresponds in the d,q-reference frame to the d- or direct vector component and also to a position estimation error and the second output variable ($\Delta u_q$) corresponds in the d,q-reference frame to the q- or quadrature vector component and also to a speed estimation error, and the two output variables ($\Delta u_d$, $\Delta u_q$) are fed to a tracking controller (6) for estimating and outputting the position ($\phi_{em}$) and/or speed ($\omega_{em}$), the procedure comprising from the motor model a third output variable ($\Delta u_L$) is computed, in that
   a) the direct and quadrature vector components of current ($i_d, i_q$) are each weighted with a direct and quadrature inductance ($L_d, L_q$) of the motor, and
   b) the third output variable ($\Delta u_L$) is formed from the difference of the two weighting results,
whereby the third output variable ($\Delta u_L$) is fed to the tracking controller (6) to be processed to estimate the position ($\phi_{em}$) and speed ($\omega_{em}$).

2. Procedure according to claim 1, wherein the current direct component ($i_d$) weighted with the direct inductance ($L_d$) is influenced by the sign or direction of the estimated speed ($\omega_{em}$).

3. Procedure according to claim 1, wherein in the motor model (9) the difference formed from the two weighting results is influenced by a motor-specific EMF constant ($K_E$) and/or by a time constant ($T_\omega$).

4. Procedure according to claim 3, wherein in the motor model (9) the difference is divided by the EMF constant ($K_E$) and/or the time constant ($T_\omega$), and in the tracking controller (5) the same EMF constant ($K_E$) and/or the same time constant ($T_\omega$) are used as parameters for the integration of a difference that is formed from the proportionally ($k_p$) amplified position estimation error ($\Delta u_d$) and the speed estimation error ($\Delta u_q$).

5. Procedure according to claim 1, wherein in the tracking controller (6) the third output variable ($\Delta u_L$) fed to it is summed with the result of an integration (22) of a difference (21), which is formed from the proportionally ($k_p$) amplified position estimation error ($\Delta u_d$) and the speed estimation error ($\Delta u_q$), and the combination result is used and/or issued as a estimated speed ($\omega_{em}$).

6. Procedure according to claim 5, wherein the difference (21) is formed in the tracking controller (6) and/or subjected to an integration (22) without a proportional part.

7. Procedure according to claim 1, wherein in the motor model (9) the current direct vector component ($i_d$) is weighted with a proportional factor ($k_p$) which is used in the tracking controller (6) for regulating the position estimation error ($\Delta u_d$).

8. Device for estimation of the electrical drive position ($\phi_{em}$) and speed ($\omega_{em}$) of a permanent magnet rotor of a brushless electrical linear or rotating motor, the device comprising:
   a) a motor modeling module (9), which has:
      aa) input interfaces (10,11,12) for motor direct and quadrature vector components ($i_d, i_q; u_d, u_q$) of the stator current ($i_1, i_2$) and a voltage demand as well as for the estimated speed ($\omega_{em}$) transformed into a rotor-related d,q reference frame,
      ab) and at least two output interfaces (13,14) for vector components ($\Delta u_d, \Delta u_q$) of an internally calculated voltage deviation, transformed into the d,q reference frame,
   b) a tracking controller (6) capable of implementation in circuitry and/or programming, for issuance of the position and/or speed, which is connected:
      ba) on the input side, at least to the two output interfaces (13,14) of the modeling module (9), and
      bb) on the output side with the speed input interface (1) of the modeling module (9),
   the device further comprising
   the motor modeling module (9) has at least a third output interface (27) for an inductance voltage deviation ($\Delta u_q$) and is designed in such a way that, by means of proportional elements (A,D), it assesses the input values for the current direct and quadrature vector components ($i_d, i_q$) with fixed values for a direct or quadrature inductance ($L_d, L_q$) of the stator (1) or the motor, by means of an inductance summation element (26) produces the difference from the inductively weighted input values and issues these via the third output interface (27), and is linked on the input side with the tracking controller (6) to receive the difference, and is embodied to process the difference for estimation of the speed ($\omega_{em}$) and to issue the latter to the speed input interface (10) of the modeling module (9).

9. Estimation device according to claim 8, wherein in the motor modeling module (9), the input interface (11) for the current direct vector component ($i_d$) is fed to a proportional element (A) with a proportional amplification ($k_p$), and in the tracking controller (6) a proportional element (20) is placed with the same or similar proportional amplification ($k_p$) for weighting of the position estimation error ($\Delta u_d$).

10. Estimation device according to claim 9, wherein in the motor model, the proportional element with the proportional amplification ($k_p$) is connected in series with an inductance proportional element (A) corresponding to the direct inductance fixed value ($L_d$).

11. Estimation device according to claim 8, wherein the output of the inductance summation element (26) is connected with the third output interface (27) via a proportional element (C) that is dimensioned in correspondence to an EMF constant ($K_E$) and/or a time constant ($T_\omega$), and in the tracking controller (6), for processing there of a possibly weighted or otherwise processed combination of the d,q vector components ($\Delta u_d, \Delta u_q$) of the voltage deviation fed by the modeling module (9) placed ahead, a first integration element (22) is placed, that is adjusted in correspondence to the same or similar EMF constant ($K_E$) and/or time constant ($T_\omega$).

12. An estimation device in accordance with claim 8 and further comprising a motor modeling module for a brushless electrical linear or rotating motor with a permanent magnet rotor, the motor modeling module comprising:
   a) input interfaces (11) for motor direct and quadrature vector components ($i_d, i_q, u_d, u_q;$) of current, transformed into a rotor-related d,q reference frame, and a voltage demand as well as for an externally estimated motor speed ($\omega_{em}$),
   b) at least two output interfaces (13,14) for direct and quadrature vector components ($\Delta u_d, \Delta u_q$) of an internally calculated voltage deviation, transformed into the d,q reference frame, and
   c) multiple proportional elements (r,A,D) for weighting of the current vector components (id,iq) with an ohmic stator or motor resistance (r) and one or more stator or motor inductances ($L_d, L_q$),
   the device further comprising
   at least yet a third output interface (27) is placed for an inductance voltage deviation ($\Delta u_L$), for generation of which one direct and one quadrature inductance proportional element (A,D) with amplification corresponding to a direct and quadrature inductance ($L_d, L_q$) and which are linked on the input side with the input interfaces (11) for the current direct and quadrature vector components ($i_d, i_q$), and the two proportional element outputs are coupled directly or indirectly with the inputs of an inductance summation element (26), and the output of the inductance summation element (26) is coupled directly or indirectly with the third output interface (27).

13. An estimation device having a motor modeling module according to claim 12, wherein a sign element (15), which on its input is connected with the input interface (10) for the externally estimated motor speed ($\omega_{em}$) and on the output side, via a multiplier element (B) is linked with the output of a proportional element (A,D), which performs weighting of the current direct or quadrature vector component ($i_d$, $i_q$) with the direct or quadrature inductance ($L_d$, $L_q$).

14. An estimation device having a motor modeling module according to claim 12, wherein the output of the inductance summation element (26) is fed via a proportional element (C), whose proportional amplification is estimated via fixed values for a motor-specific EMF constant ($K_E$) and/or time constant ($T_\omega$) to the third output interface (27).

15. An estimation device according to claim 8 and further comprising a tracking controller (6) comprising:
  a) at least two input interfaces (18,19) for direct and quadrature vector components ($\Delta u_d$, $\Delta u_q$) of an externally calculated and inputted voltage deviation, transformed into the d,q reference frame,
  b) at least one output interface (23) for an internally estimated drive speed ($\omega_{em}$),
  c) a proportional element (20,$k_p$), whose input is connected with the input interface (18) for the direct vector component ($\Delta u_d$) of the externally calculated voltage deviation or position estimation error ($\Delta u$),
  d) a first tracking summation element (21), whose first input is connected with the output of the proportional element (20,$k_p$), and whose second input is connected via the second input interface (19) with the quadrature vector component ($\Delta u_q$) of the voltage deviation or of the error in estimating speed,
the device further comprising
at least yet a third input interface (28) for an externally fed inductance voltage deviation ($\Delta u_L$), whereby the third input interface (28) is connected with the first input of a linking element, whose second input directly or indirectly captures the output of the first tracking summation element (21), and whose output is able to be accessed by at least one output interface (23) for the drive speed ($\omega_{em}$).

16. An estimation device having a tracking controller according to claim 15, wherein the linking element is embodied as a second tracking summation element (29) that is placed directly or indirectly after the first tracking summation element (21).

17. An estimation device having a tracking controller according to claim 15, wherein a single integration element (22) is placed between the first tracking summation element (21) and the linking or second tracking summation element (29).

18. An estimation device having a tracking controller according to claim 17, wherein the integration element (22) is dimensioned with no proportional part and/or on the basis of the EMF constant ($K_E$) and/or time constant ($T_\omega$).

* * * * *

UNITED STATES PATENT AND TRADEMARK OFFICE
CERTIFICATE OF CORRECTION

PATENT NO.       : 7,999,498 B2
APPLICATION NO.  : 12/177182
DATED            : August 16, 2011
INVENTOR(S)      : Fritz Riner Gotz, Viktor Barinberg and Franz Jager It is certified that error appears in the above-identified patent and that said Letters Patent is hereby corrected as shown below:

Claim 8, Column 7, line 65 "$\Delta u_q$" should be "$\Delta u_L$"

Signed and Sealed this
Third Day of July, 2012

David J. Kappos
*Director of the United States Patent and Trademark Office*